United States Patent
Rao et al.

(10) Patent No.: US 11,531,641 B2
(45) Date of Patent: Dec. 20, 2022

(54) STORAGE SYSTEM DEDUPLICATION WITH SERVICE LEVEL AGREEMENTS

(71) Applicant: QUEST SOFTWARE INC., Aliso Viejo, CA (US)

(72) Inventors: Goutham Rao, Los Altos, CA (US); Ratna Manoj Bolla, Hyderabad (IN); Vinod Jayaraman, San Francisco, CA (US)

(73) Assignee: QUEST SOFTWARE INC., Aliso Viejo, CA (US)

( * ) Notice: Subject to any disclaimer, the term of this patent is extended or adjusted under 35 U.S.C. 154(b) by 184 days.

(21) Appl. No.: 16/189,813

(22) Filed: Nov. 13, 2018

(65) Prior Publication Data
US 2019/0079942 A1    Mar. 14, 2019

Related U.S. Application Data

(63) Continuation of application No. 13/786,759, filed on Mar. 6, 2013, now Pat. No. 10,127,235.

(51) Int. Cl.
| | |
|---|---|
| *G06F 16/00* | (2019.01) |
| *G06F 16/11* | (2019.01) |
| *G06F 16/17* | (2019.01) |
| *G06F 16/174* | (2019.01) |

(52) U.S. Cl.
CPC ........ *G06F 16/122* (2019.01); *G06F 16/1724* (2019.01); *G06F 16/1752* (2019.01)

(58) Field of Classification Search
CPC . G06F 16/1752; G06F 16/1724; G06F 16/122
See application file for complete search history.

(56) References Cited

U.S. PATENT DOCUMENTS

| | | | | |
|---|---|---|---|---|
| 5,832,525 | A * | 11/1998 | Wong | G06F 16/902 707/E17.037 |
| 7,350,021 | B2 * | 3/2008 | Itagaki | G11B 20/1201 360/71 |
| 7,873,619 | B1 * | 1/2011 | Faibish | G06F 16/13 707/823 |
| 8,285,758 | B1 * | 10/2012 | Bono | G06F 16/122 707/822 |
| 9,026,496 | B1 * | 5/2015 | Bachu | G06F 16/122 707/645 |
| 9,026,503 | B2 * | 5/2015 | Sharma | G06F 16/1748 707/692 |
| 9,710,386 | B1 * | 7/2017 | Zhang | G06F 9/5016 |
| 2003/0041211 | A1 * | 2/2003 | Merkey | G06F 11/1076 714/E11.034 |
| 2004/0243692 | A1 * | 12/2004 | Arnold | H04L 67/1008 709/220 |

(Continued)

*Primary Examiner* — Hasanul Mobin
(74) *Attorney, Agent, or Firm* — Maschoff Brennan

(57) ABSTRACT

Mechanisms are provided for adjusting a configuration of data stored in a storage system. According to various embodiments, a storage module may be configured to store a configuration of data. A processor may be configured to identify an estimated performance level for the storage system based on a configuration of data stored on the storage system. The processor may also be configured to transmit an instruction to adjust the configuration of data on the storage system to meet the service level objective when the estimated performance level fails to meet a service level objective for the storage system.

20 Claims, 7 Drawing Sheets

(56) References Cited

U.S. PATENT DOCUMENTS

| | | | |
|---|---|---|---|
| 2004/0243699 A1* | 12/2004 | Koclanes | H04L 41/0893 709/224 |
| 2007/0276990 A1* | 11/2007 | Mosek | G06F 12/0862 711/E12.057 |
| 2008/0077762 A1* | 3/2008 | Scott | G06F 16/1724 711/170 |
| 2009/0254594 A1* | 10/2009 | Burchall | G06F 16/2453 |
| 2009/0271402 A1* | 10/2009 | Srinivasan | G06F 16/174 |
| 2010/0332401 A1* | 12/2010 | Prahlad | H04L 63/0428 705/80 |
| 2010/0333116 A1* | 12/2010 | Prahlad | G06F 3/067 713/153 |
| 2012/0047189 A1* | 2/2012 | Staffer | G06F 16/1727 707/830 |
| 2012/0131025 A1* | 5/2012 | Cheung | G06F 16/1752 707/755 |
| 2013/0226881 A1* | 8/2013 | Sharma | G06F 16/1748 707/692 |
| 2013/0275669 A1* | 10/2013 | Naga | H04L 67/2857 711/113 |
| 2013/0326186 A1* | 12/2013 | Shaikh | G06F 9/45558 711/170 |
| 2014/0046912 A1* | 2/2014 | Baldwin | G06F 16/1727 707/692 |

\* cited by examiner

| Dictionary 701 — 700 ||
|---|---|
| Fingerprint 711 | Storage Location 721 |
| a | Location 723 |
| b | Location 725 |
| c | Location 727 |

| Dictionary 731 — 730 ||
|---|---|
| Fingerprint 741 | Storage Location 751 |
| d | Location 753 |
| e | Location 755 |
| f | Location 757 |

| Dictionary 761 — 760 ||
|---|---|
| Fingerprint 771 | Storage Location 781 |
| h | Location 783 |
| i | Location 785 |
| j | Location 787 |

Figure 7

STORAGE SYSTEM DEDUPLICATION WITH SERVICE LEVEL AGREEMENTS

RELATED APPLICATION

This patent application is a continuation application that claims the benefit of the filing date of U.S. patent application Ser. No. 13/786,759, filed Mar. 6, 2013, and entitled "STORAGE SYSTEM DEDUPLICATION WITH SERVICE LEVEL AGREEMENTS" which is incorporated herein by reference in its entirety.

TECHNICAL FIELD

The present disclosure relates to deduplication of storage systems under service level objectives.

DESCRIPTION OF RELATED ART

In computing, data deduplication is a specialized data compression technique for eliminating duplicate copies of repeating data. Deduplication techniques may be used to improve storage utilization or network data transfers by effectively reducing the number of bytes that must be sent or stored. In the deduplication process, unique chunks of data, or byte patterns, are identified and stored during a process of analysis. As the analysis continues, other chunks are compared to the stored copy and a redundant chunk may be replaced with a small reference that points to the stored chunk. Given that the same byte pattern may occur dozens, hundreds, or even thousands of times, the amount of data that must be stored or transferred can be greatly reduced. The match frequency may depend at least in part on the chunk size. Different storage systems may employ different chunk sizes or may support variable chunk sizes.

Deduplication differs from standard file compression techniques. While standard file compression techniques typically identify short repeated substrings inside individual files, storage-based data deduplication involves inspecting potentially large volumes of data and identify potentially large sections—such as entire files or large sections of files—that are identical, in order to store only one copy of a duplicate section. In some instances, this copy may be additionally compressed by single-file compression techniques. For example, a typical email system might contain many instances of the same one megabyte (MB) file attachment. Each time the system is backed up, all 100 instances of the attachment are saved, requiring 100 MB storage space. With data deduplication, the storage space required may be limited to only one instance of the attachment. Subsequent instances may be referenced back to the saved copy for deduplication ratio of roughly 100 to 1.

BRIEF DESCRIPTION OF THE DRAWINGS

The disclosure may best be understood by reference to the following description taken in conjunction with the accompanying drawings, which illustrate particular embodiments of the present invention.

FIG. 7 illustrates a particular example of an arrangement of data segments among a set of data stores.

BRIEF DESCRIPTION OF PARTICULAR EMBODIMENTS

Figure 1:
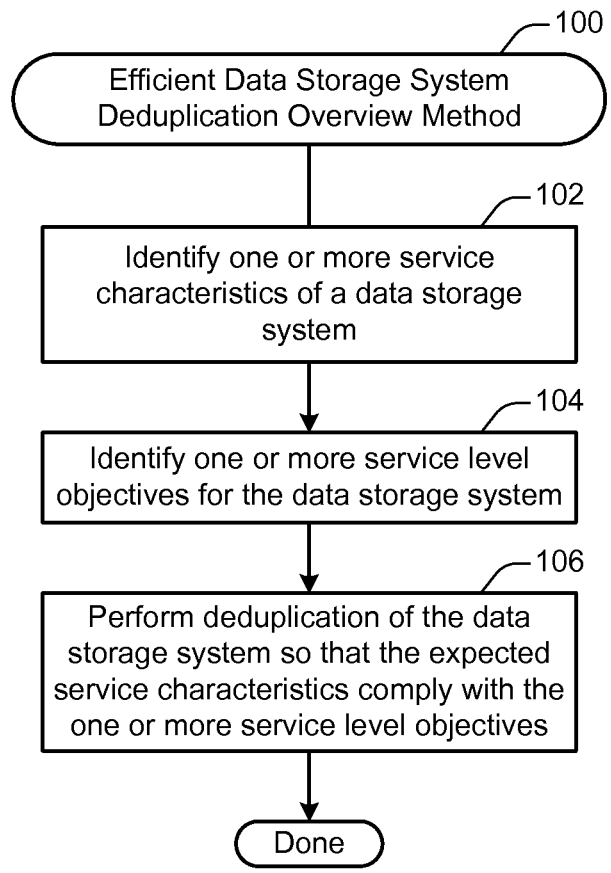
FIG. 1 illustrates a particular example of an overview method for efficient data storage system deduplication.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular data storage mechanisms. However, it should be noted that the techniques and mechanisms of the present invention apply to a variety of different data storage mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

OVERVIEW

Techniques and mechanisms are provided for improving the efficiency of access to information stored on storage mediums. According to various embodiments, deduplication and/or defragmentation of storage systems may be performed based at least in part on feedback from or analysis of the underlying storage system. In addition, deduplication and/or defragmentation may be performed based at least in part on service objectives such as service level agreements specifying service characteristics such as readback throughput, space usage, and other such properties. By balancing these concerns, storage savings may be increased while meeting service objectives.

EXAMPLE EMBODIMENTS

Many storage mediums, such as magnetic storage mediums, have high random access latency in comparison to sequential access. Accordingly, arranging related data segments in a contiguous order on a storage system provides higher average read throughput than storing the related data segments on different areas of the storage system.

However, many storage systems often store duplicate data blocks, such as many copies of the same text string that appears in many files. Eliminating this duplication reduces the amount of storage space required to store the data on the storage system. However, deduplication may in some instances come at the cost of reduced average read throughput because deduplication may lead to fragmentation of data blocks that constitute a file. To reduce duplication, a duplicate data block may be replaced with a reference to a single copy of the data block. This reference requires less storage space to store but may require the storage system to access data out of order, moving a read head more often to different locations on the storage system to access a single file or related group of files. Thus, fragmentation may have adverse effects for readback because it may result in an increase in non-sequential disk access. Further, fragmentation may lead to additional work during space reclamation.

Accordingly, a tension exists between readback throughput and fragmentation caused by deduplication. Techniques and mechanisms described herein may be used to provide improved efficiency in a storage system by analyzing the characteristics of a storage system so that data may be stored in a way that saves space while still not compromising readback throughput.

In many storage systems, as discussed herein, readback throughput increases as data sequentiality increases. Often this relationship is roughly linear at first and then eventually asymptotic. That is, increases in sequentiality in a highly fragmented storage system often provide significant gains in readback throughput. However, these marginal gains trail off over time as readback throughput approaches the theoretical maximum for the storage system. The relationship may in at least some instances include a critical point of significantly diminishing returns for larger sequentiality.

FIG. 1 illustrates a particular example of an overview method 100 for efficient data storage system deduplication. According to various embodiments, the method 100 may be performed at a computing device having access to a storage system or at the storage system itself The method 100 may facilitate the rearrangement and/or deduplication of data stored on the storage system to provide efficiency gains in terms of the storage space required and/or one or more service objectives for reading and/or writing data to the storage system.

At 102, one or more service characteristics of a data storage system are identified. According to various embodiments, the service characteristics may reflect the hardware and/or software characteristics of the data system. For instance, different levels of contiguous data may provide different benefits on different storage systems. Techniques for identifying one or more service characteristics of a data storage system are discussed in further detail with respect to FIG. 4. A particular example of a graph of expected system performance for a storage system is shown in FIG. 5.

At 104, one or more service level objectives for the data storage system are identified. According to various embodiments, the service level objectives may be defined or identified in various ways. For example, the data storage system may be part of an on-demand storage system, and the service provider may provide the service subject to a service level agreement (SLA). The service level agreement may specify, for instance, an agreed-upon level of readback throughput for retrieving information stored on the storage system. As another example, the administrator of the data storage system may hope to achieve one or more customer service objectives.

According to various embodiments, service levels objectives are described in some places herein as data readback throughput. However, the techniques described herein are widely applicable to a range of service level objectives. For instance, techniques may be applied to data write throughput as well. Also, expected read and write speeds may be determined at a minimum level, a maximum level, an average (mean) level, an average (median) level, or any other level.

At 106, deduplication of the data storage system is performed so that the expected service characteristics of the storage system comply with the one or more service level objectives. According to various embodiments, deduplication of the storage system may reflect the service characteristics identified in operation 102. For instance, a sufficient amount of deduplication may be performed so that readback throughput reaches a threshold objective level. However, the system may identify the point at which further deduplication incurs relatively significant costs without providing sufficient benefits. Techniques for performing deduplication of the data storage system are discussed in further detail with respect to FIG. 6.

Figure 2:
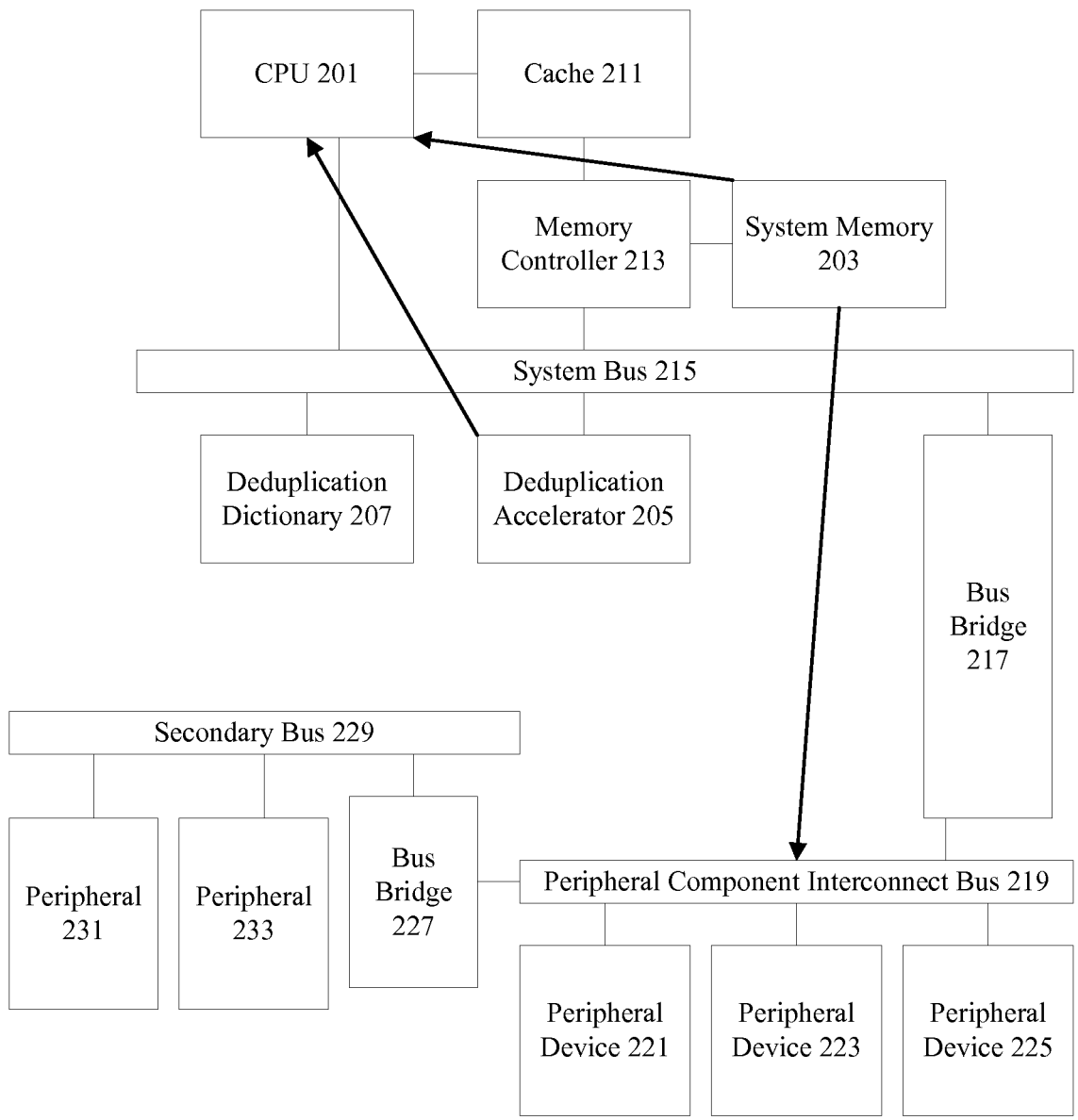
FIG. 2 illustrates a particular example of a system that can use the techniques and mechanisms of the present invention.

FIG. 2 illustrates a particular example of a system that can be used in conjunction with the techniques and mechanisms of the present invention. According to various embodiments, data is received at an accelerated deduplication system 200 over an interface such as a network interface. A data stream may be received in segments or blocks and maintained in system memory 203. According to various embodiments, a processor or CPU 201 maintains a state machine but offloads boundary detection and fingerprinting to a deduplication engine or deduplication accelerator 205. The CPU 201 is associated with cache 211 and memory controller 213. According to various embodiments, cache 211 and memory controller 213 may be integrated onto the CPU 201.

In particular embodiments, the deduplication engine or deduplication accelerator 205 is connected to the CPU 201 over a system bus 215 and detects boundaries using an algorithm such as Rabin to delineate segments of data in system memory 203 and generates fingerprints using algorithms such as hashing algorithms like SHA-1 or MD-5. The deduplication engine 205 accesses the deduplication dictionary 207 to determine if a fingerprint is already included in the deduplication dictionary 207. According to various embodiments, the deduplication dictionary 207 is maintained in persistent storage and maps segment fingerprints to segment storage locations. In particular embodiments, segment storage locations are maintained in fixed size extents. Data store suitcases, references, metadata, etc., may be created or modified based on the result of the dictionary lookup.

If the data needs to be transferred to persistent storage, the optimization software stack will communicate to the CPU 201 the final destination direct memory access (DMA) addresses for the data. The DMA addresses can then be used to transfer the data through one or more bus bridges 217 and/or 227 and secondary buses 219 and/or 229. An example of a secondary bus is a peripheral component interconnect (PCI) bus 219. Peripherals 221, 223, 225, 231, and 233 may be peripheral components and/or peripheral interfaces such as disk arrays, network interfaces, serial interfaces, timers, tape devices, etc.

Figure 3:
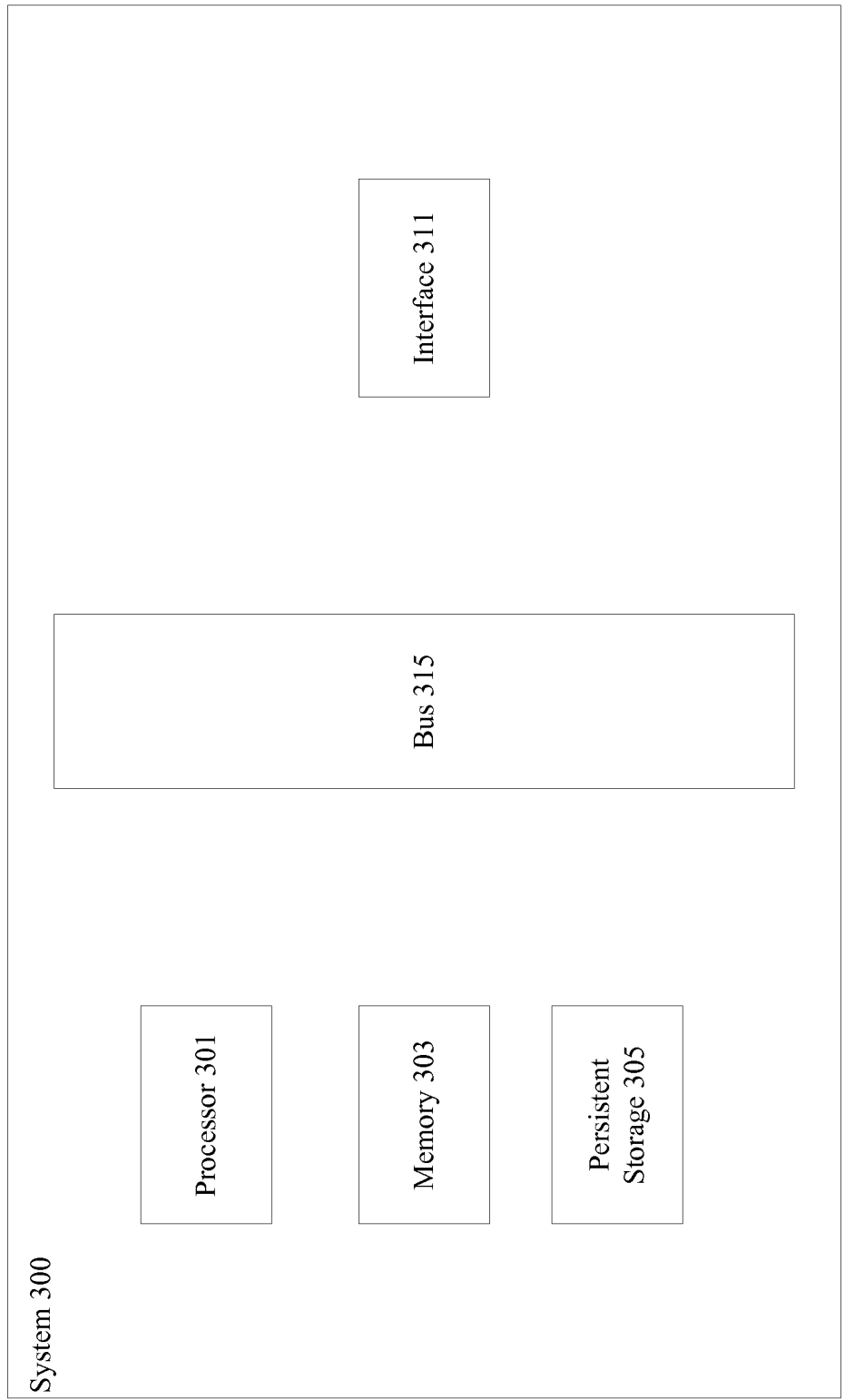
FIG. 3 illustrates a particular example of a storage system.

A variety of devices and applications can implement particular examples of the present invention. FIG. 3 illustrates one example of a system that can be used as a storage node in a deduplication system. According to particular example embodiments, a system 300 suitable for implementing particular embodiments of the present invention includes a processor 301, a memory 303, an interface 311, persistent storage 305, and a bus 315 (e.g., a PCI bus). When acting under the control of appropriate software or firmware, the processor 301 is responsible for such tasks such as optimization. Various specially configured devices can also be used in place of a processor 301 or in addition to processor 301. The complete implementation can also be done in custom hardware. The interface 311 is typically configured to send and receive data packets or data segments over a network. Particular examples of interfaces the device supports include Ethernet interfaces, frame relay interfaces, cable interfaces, DSL, interfaces, token ring interfaces, and the like. Persistent storage 305 may include disks, disk arrays, tape devices, solid state storage, etc.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 300 uses memory 303 to store data and program instructions and maintain a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Figure 4:
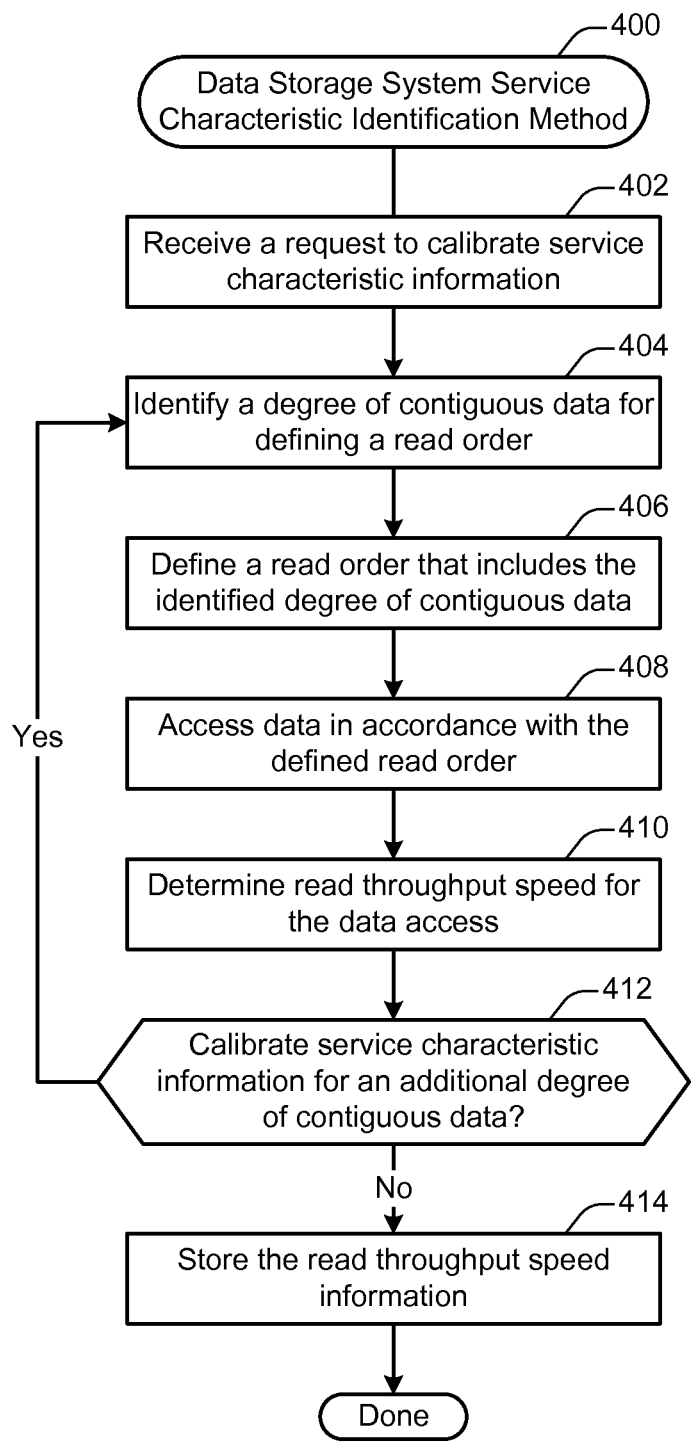
FIG. 4 illustrates a particular example of a method for identifying a service characteristic of a data storage system.
Figure 5:
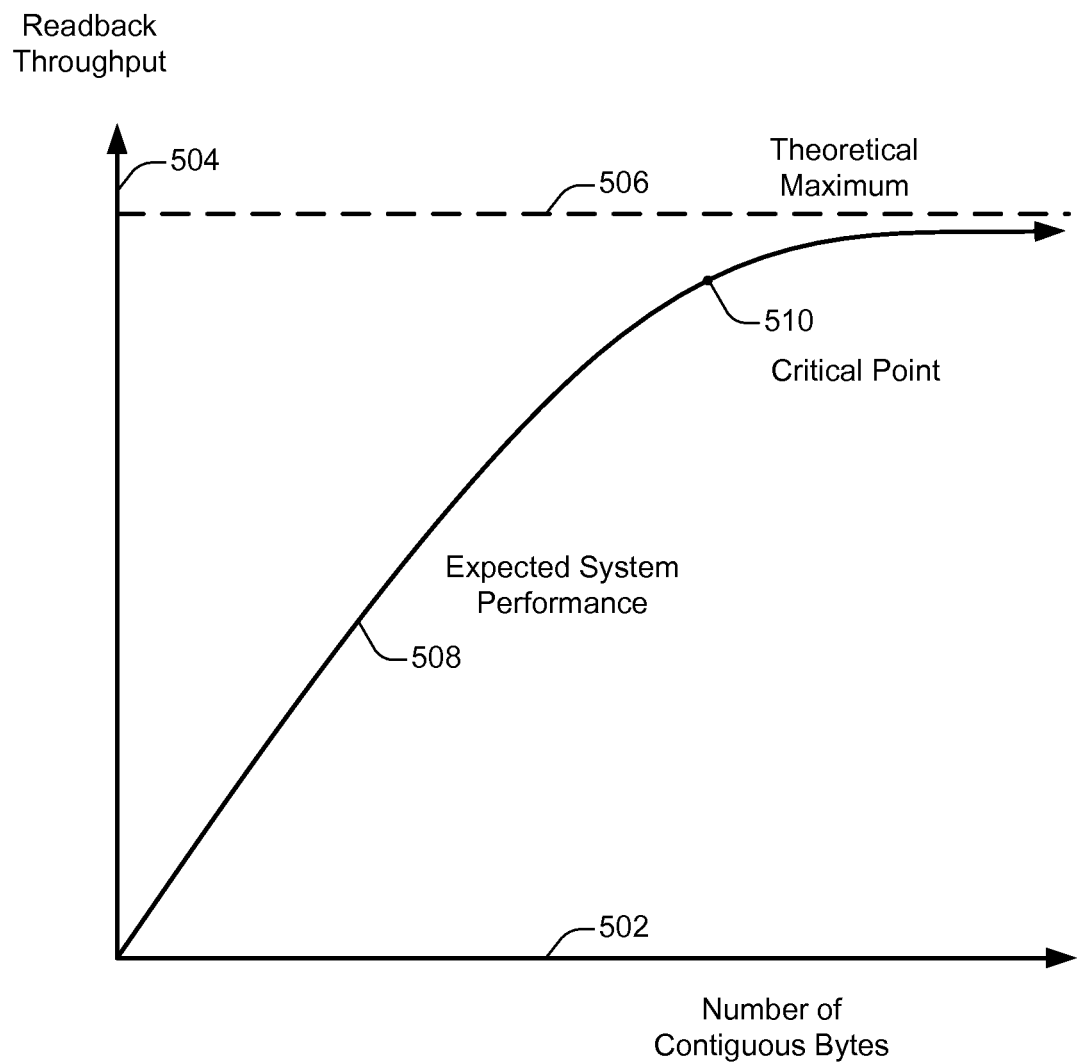
FIG. 5 illustrates a particular example of a graph of expected system performance for a storage system.

FIG. 4 illustrates a particular example of a method 400 for identifying a service characteristic of a data storage system. According to various embodiments, the method 400 may be performed at a computing system configured to access or control a storage system, such as the system discussed with respect to FIG. 3. The method 400 may be used to establish service characteristics for the purpose of improving the process of deduplicating, defragmenting, or otherwise managing the storage system.

According to various embodiments, the service characteristic identified by the method 400 may be a value or may be a relationship or curve, such as that shown in FIG. 5. For instance, the service characteristic may be the average readback throughput as affected by changes in the degree of contiguity among the data being read. However, other service characteristics may also be identified, such as an average write throughput under changes in the degree of contiguity.

According to various embodiments, the degree of data contiguity may indicate the localized or average amount of related data stored contiguously on the storage system. For instance, if a set of 99 related and similarly-sized data segments is stored in three internally contiguous but separate blocks, then the set of data segments may be characterized as having a degree of data contiguity of 33 data segments. However, data contiguity may be measured in any of various ways.

At 402, a request to calibrate service characteristic information is received. According to various embodiments, service characteristic information may be calibrated at various times. For example, the information may be calibrated before providing the storage system for use. As another example, the information may be calibrated when a storage system is first activated or rebooted. As yet another example, the information may be calibrated periodically, such as during maintenance of the storage system. As still another example, the information may be calibrated as part of a machine learning process that iteratively determines the capabilities and properties of the storage system as it is being used. Then, the arrangement of data stored on the storage system may be iteratively updated to reflect these storage system capabilities and properties.

According to various embodiments, service characteristics such as the relationship of readback throughput to the degree of data segment contiguity may vary across storage systems. For instance, even two storage systems that are in many ways identical may differ in some key respects, such as the number and/or quality of storage devices included in each system.

At 404, a degree of contiguous data for defining a read order is identified. According to various embodiments, service characteristic information may be determined for any degree of contiguous data that may be present in the storage system. For example, a common or likely degree of contiguity may be selected for analysis. As another example, a successive set of degrees of contiguity may be measured, such as degrees spaced at regular or designated intervals.

At 406, a read order that includes the identified degree of contiguous data is defined. According to various embodiments, the read order may be defined by selecting data segments on the storage system to read such that the read order reflects the identified degree of contiguous data. For example, the identified degree of contiguous data may indicate that on average, every four segment of data read are contiguous. In this case, a set of data segments that possess this property may be selected for reading. In some instances, data segments may be selected in a regular fashion. For instance, data segments may be selected so that each successive four segment grouping of data to be read is contiguous. Alternately, data segments may be selected in a less regular fashion. For instance, data segments may be selected in a somewhat random ordering with an average of four contiguous segments.

At 408, data on the storage system is accessed in accordance with the defined read order. According to various embodiments, the data may be accessed by transmitting one or more instructions to the storage system or various components of the storage system to cause the data to be accessed. Accessing the data may involve some amount of moving a storage head on a magnetic disk, moving a laser on an optical disk, or any other type of data access. Then, data may be read from the storage system and transmitted, for instance via a data transfer bus.

At 410, read throughput speed for the data access is determined According to various embodiments, the read throughput speed may be determined or reported by the storage system or may be determined by a computing device that is directing the identification process. As discussed herein, the read throughput speed may be an average speed that is calculated over a designated amount of data access. The read throughput speed may be measured by dividing the total amount of data read from the storage system by the time required to read the accessed data.

At 412, a determination is made as to whether to calibrate service characteristic information for an additional degree of contiguous data. According to various embodiments, the determination may be based upon any of various factors. For example, service characteristic information may be determined for any realistic degree of contiguous data that may be present in the storage system. However, some very low and/or very high degrees of contiguity of data may be very unlikely to occur. As another example, service characteristic information may be determined for any degree of contiguous data where the expected data throughput is unknown or uncertain. However, it may be possible to extrapolate or estimate service characteristic information for some degrees of contiguous data based on service characteristic information for related degrees of contiguous data. As yet another example, service characteristic information may be determined for some set of predetermined degrees of contiguous data, such as degrees spaced at regular or designated intervals.

At 414, the read throughput speed information is stored. According to various embodiments, the read throughput speed information may be stored in any format suitable for retrieval when performing deduplication and/or defragmentation of the storage system. For example, the information may be stored in a chart format similar to that shown in FIG. 5. As another example, the information may be stored in a table or other discrete lookup format. As yet another example, the information may be used to estimate a functional form, such as the function associated with the expected read throughput curve shown in the graph illustrated in FIG. 5.

According to various embodiments, the read throughput speed information may be stored for usage in performing data deduplication and/or defragmentation to balance data storage with read throughput. Techniques for performing efficient storage system deduplication are discussed in further detail with respect to FIG. 6.

FIG. 5 illustrates a particular example of a graph 500 of expected system performance for a storage system. According to various embodiments, the graph 500 represents the expected readback performance of a particular storage system when reading a number of contiguous bytes.

The graph 500 includes an X-axis 502 corresponding to a number of contiguous bytes, a Y-axis 504 corresponding to readback throughput, a line 506 corresponding to the theoretical maximum of readback throughput, a curve 508 corresponding to the expected performance of a particular system, and a critical point 510.

According to various embodiments, the Y-axis 504 corresponding to readback throughput represents the speed at which data is retrieved from the storage system. The theoretical maximum 506 represents the highest throughput that may be achieved by the storage system under optimal conditions. The X-axis 502 corresponding to a number of contiguous bytes represents the number of bytes arranged next to each other on the storage system that are being retrieved.

In many storage systems, such as those that store information on disks, accessing contiguous data is significantly faster than accessing data located on different parts of the storage system. When accessing data stored on contiguous locations on the storage system, the read/write head need not be moved at all or vary far. For instance, in some storage systems a read/write head is capable of reading a block of data at once, and the block of data may include more than one contiguous data segment. In contrast, when accessing data stored on different parts of the storage system, the read/write head must be moved from one location to another.

According to various embodiments, the curve 508 corresponding to the expected system performance may be determined as discussed with respect to FIG. 4. Different storage systems may have different expected system performance curves that reflect hardware and/or software characteristics that differ between storage systems. For instance, some storage systems may receive a greater relative benefit from an increase in the number of contiguous bytes on the lower range but may reach the critical point 510 earlier.

Although the relationship describing system performance is sometimes referred to herein as a curve, the relationship need not be a smooth function or curve in the mathematical sense. Instead, the relationship may exhibit any form. For instance, the relationship may in some instances exhibit sudden shifts or jumps or may level off into lines.

According to various embodiments, as shown in FIG. 5, expected readback throughput increases as the number of contiguous bytes being read by the storage system increases. This increase reflects the fact that as the number of contiguous bytes increases, the read/write head on the storage system does not need to make as much movements. However, at the critical point 510, the system reaches a point of diminishing returns, where a relatively large increase in the amount of contiguous data yields only a relatively small increase in expected readback throughput.

Figure 6:
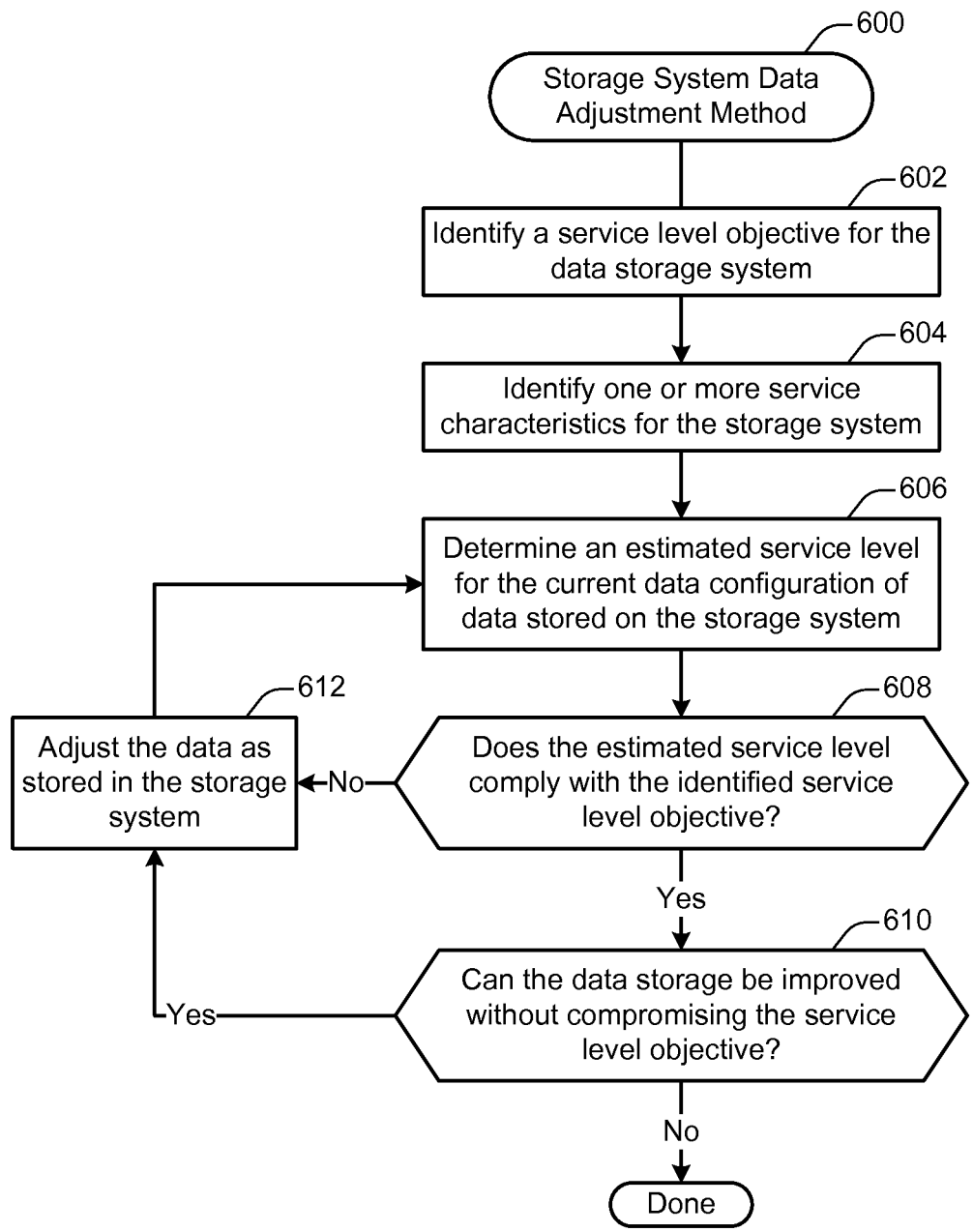
FIG. 6 illustrates a particular example of a method for performing data adjustment in a storage system.

FIG. 6 illustrates a particular example of a method 600 for performing data adjustment in a storage system. According to various embodiments, the method 600 may be performed as part of a process for maintaining or managing the storage system to ensure that service-related objectives are met. For instance, operators of the storage system may seek to meet a service level objective that designates an average readback throughput rate for retrieving data stored on the storage system.

According to various embodiments, the method 600 may be performed at a computing device configured to control or manage a storage system. The method 600 may be performed upon request, periodically, at scheduled times, when a triggering event is detected, or in any other fashion.

At 602, a service level objective for the data storage system is identified. A service level objective may be any property or characteristic that is desired for the operation of the storage system. For example, the service level objective may be a desired average data read or write throughput level. As another example, the service level objective may be a desired level of compression to be achieved via deduplication or other data management techniques. In particular embodiments, more than one service level objective may be identified. For instance, a service level agreement may specify both an average data readback throughput level and a data storage compression level.

At 604, one or more service characteristics for the storage system are identified. According to various embodiments, the one or more service characteristics may be initially identified as discussed with respect to FIGS. 4 and 5. Then, a service characteristic may be retrieved as needed for analysis.

In particular embodiments, a service characteristic may be defined based on a graph that represents the hardware and/or software capacities and properties of the underlying storage system. Based upon the graph, a function may be constructed that outputs a characteristic based on an input value. For instance, the function may indicate the expected throughput as a function of the degree of contiguous bytes.

At 606, an estimated service level for the current data configuration of data stored on the storage system is determined According to various embodiments, the estimated service level may be determined by analyzing the data stored on the storage system and comparing the data to the service characteristics identified at operation 604. For instance, if the average degree of data segment contiguity is 64 data segments, this level of data segment contiguity may be analyzed based a relationship, graph, or function, such as the graph shown in FIG. 5, to estimate the degree of readback throughput for the storage system. For instance, the estimated readback throughput of the data storage system may be 1.5 gigabits per second, 6 gigabits per second, 300 megabits per second, or any other read speed.

In particular embodiments, an actual service level may be determined instead of, or in addition to, an estimated service level. For instance, storage system logs may be used to determine the average readback throughput associated with data accessed on the storage system during a designated time period.

At 608, a determination is made as to whether the estimated service level complies with the identified service level objective. According to various embodiments, the determination may be made by comparing the estimated service level determined at operation 606 with the one or more service characteristics identified at operation 604. For example, the estimated readback throughput may be 3.6 gigabits per second, which would meet a service level agreement guaranteeing 3.5 gigabits per second of average readback throughput.

At 610, a determination is made as to whether the data storage may be improved without compromising the service level objective. For example, if the estimated readback throughput is 3.6 gigabits per second and the service level agreement guarantees 3.5 gigabits per second, further deduplication of the storage system may risk violating the service level agreement. In this situation, additional data adjustment may be undesirable. In another example, if instead the estimated readback throughput is 6 gigabits per second with the same service level agreement guaranteeing a readback throughput of 3.5 gigabits per second, then the storage system may offer significant potential for data adjustment. For instance, the storage system may be deduplicated or otherwise managed to reclaim space. Then, even if such an operation reduced the estimated readback throughput, for instance by 2 gigabits per second, the resulting throughput would still fail within the objective specified by the service level agreement.

At 612, the data as stored in the storage system is adjusted. According to various embodiments, different types of data adjustment operations may have various consequences for the service level of any of various service characteristics associated with the storage system. Accordingly, the data stored in the storage system may be adjusted to meet any of various objectives. For example, the data may be adjusted to improve average readback throughput. As another example, the data may be adjusted to reduce the amount of storage space used or to reclaim storage space.

According to various embodiments, the adjustment to the data may include any of various types of storage related operations. For example, deduplication operations may remove or aggregate duplicate data stored on the storage system, for instance by replace one or more copies of duplicate data with a reference to a different location at which the data is stored. As another example, defragmentation operations may move related data that is initially located at different areas on the storage system to areas that are located closer together, such as within contiguous blocks. As yet another example, storage space reclamation operations may shift data from one location to another to free up contiguous blocks of space on the storage system for potentially storing other data.

FIG. 7 illustrates a particular example of an arrangement of data segments among a set of data stores. The example shown in FIG. 7 includes three data stores 700, 730, and 760. Each data store also includes a set of data segments. The data stores also each include a respective data dictionary 701, 731, and 761 that identifies the data fingerprints and storage locations of data segments stored in the data store. Each data segment is associated with a respective fingerprint, indicated in a respective fingerprint column 711, 741, and 771. Each data segment is also associated with a storage location, indicated in a respective storage location column 721.

According to various embodiments, each data store is configured to store an amount of data. The amount of data may be different in different storage systems. The amount of data stored in a data store may be divided among a number of different data segments. In particular embodiments, different data segments may be of different sizes. Alternately, in some storage systems data segments may be of similar or identical sizes.

According to various embodiments, each data segment is stored at a particular storage location within the associated data store. For instance, the data store 700 has data stored at locations 723, 725, and 727. The data store 730 has data stored at locations 753, 755, and 757. The data store 760 has data stored at locations 783, 785, and 787. The data location may be a particular address within the storage system at which a data segment is located.

According to various embodiments, each data segment is associated with a particular fingerprint. The fingerprint serves as an identifier for a data segment. In different storage systems, fingerprints may be assigned in different ways. For example, fingerprints may be assigned as part of a sequential numbering technique. As another example, a fingerprint may be a hash or other transformation of the data stored in the storage block.

According to various embodiments, each data dictionary describes the data segments stored within the associated data store. For instance, each data dictionary may describe each data segment stored in the data store by way of a fingerprint/storage location pair. A data dictionary may describe where to access each data segment stored in the data store. For example, if a request is transmitted to access a data segment stored on the data store, the data segment may be identified based on the data dictionary associated with the data store. For instance, the request may indicate a particular fingerprint associated with a data segment stored in the data store.

According to various embodiments, a data segment may be any collection of bits of data. The data segment may be stored in an area of memory on a storage system. For instance, the data segment may be stored in a block or blocks of memory on an optical disk drive. In some storage systems, data segments may be of fixed size. In other storage systems, different data segments may be of different sizes. Techniques and mechanisms described herein may be applied in conjunction with various types of data segments, including fixed-sized or variable-sized data segments.

According to various embodiments, the information stored in the data segment may be any information capable of being used by a computing system. For instance, the information may be part or all of a file, of configuration information, of operating system information, of a program such as a virtual machine or web browser, of file system data, or any other information.

According to various embodiments, data segments may be accessed in various orders. For instance, at least some of the data segments shown in FIG. 7 may be associated with a data file such as a document. As described herein, in many instances data may be stored in a different order from the order in which it is most often accessed. For example, initially contiguous data may be stored in a different order upon deduplication. For instance, if the data segments corresponding to the fingerprints "a, b, c, d, e" shown in FIG. 7 combine to form a single file, the data segment corresponding to fingerprint "b" may be deleted and replaced with a reference to the data segment corresponding to fingerprint "i" if the data segments corresponding to fingerprints "b" and "i" are identical. In this case, the deduplication may decrease data readback throughput since an additional datastore, datastore 760, would need to be accessed to read all of the data segments that make up the file.

According to various embodiments, accessing two data segments stored on the same data store may require less access time and a lower usage of computing resources than accessing the same two data segments if they are stored on the same data store. In order to provide improved efficiency, as described herein, data segments may be rearranged to improve contiguity or reclaim space.

The arrangement of data segments shown in FIG. 7 is an example shown for purposes of illustration. It should be noted that although only three data stores and nine file segments are shown in FIG. 7, a typical data storage system includes many more data stores and file segments.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method, comprising:
   receiving a request to calibrate service characteristic information, the service characteristic information including a relationship between read throughput speed information to a degree of data segment contiguity in a data storage system;
   identifying a degree of contiguous data present in the data storage system;
   defining a read order by selecting two or more data segments of the data storage system to read such that the read order reflects the identified degree of contiguous data;
   accessing data on the data storage system in accordance with the read order;
   determining a read throughput speed for the data access; and
   storing the read throughput speed information corresponding to the identified degree of contiguous data.

2. The method of claim 1, further comprising calibrating service characteristic information for a different degree of contiguous data.

3. The method of claim 1, further comprising calibrating service characteristic information for a set of predetermined degrees of contiguous data.

4. The method of claim 3, wherein the set of predetermined degrees of contiguous data are spaced at regular or designated intervals.

5. The method of claim 1 further comprising estimating a functional form of an expected read throughput speed.

6. The method of claim 1 further comprising performing a deduplication operation in view of the stored read throughput speed information.

7. The method of claim 6, wherein performing the deduplication operation includes balancing data storage and the stored read throughput speed information.

8. One or more non-transitory computer readable media having instructions stored thereon that, when executed by a processor, cause a system to perform operations comprising:
   receiving a request to calibrate service characteristic information, the service characteristic information including a relationship between read throughput speed information to a degree of data segment contiguity in a data storage system;
   identifying a degree of contiguous data present in the data storage system;
   defining a read order by selecting two or more data segments of the data storage system to read such that the read order reflects the identified degree of contiguous data;
   accessing data on the data storage system in accordance with the read order;
   determining a read throughput speed for the data access and
   storing the read throughput speed information corresponding to the identified degree of contiguous data.

9. The one or more non-transitory computer readable media of claim 8, further comprising calibrating service characteristic information for a different degree of contiguous data.

10. The one or more non-transitory computer readable media of claim 8, further comprising calibrating service characteristic information for a set of predetermined degrees of contiguous data.

11. The one or more non-transitory computer readable media of claim 10, wherein the set of predetermined degrees of contiguous data are spaced at regular or designated intervals.

12. The one or more non-transitory computer readable media of claim 8, the operations further comprising estimating a functional form of an expected read throughput speed.

13. The one or more non-transitory computer readable media of claim 8, the operations further comprising performing a deduplication operation in view of the stored read throughput speed information.

14. The one or more non-transitory computer readable media of claim 13, wherein performing the deduplication operation includes balancing data storage and the stored read throughput speed information.

15. A system, comprising:

a memory; and one or more processors operatively coupled to the memory, the one or more processors configured to execute operations comprising:

receive a request to calibrate service characteristic information, the service characteristic information including a relationship between read throughput speed information to a degree of data segment contiguity in a data storage system;

identify a degree of contiguous data present in the data storage system;

define a read order by selecting two or more data segments of the data storage system to read such that the read order reflects the identified degree of contiguous data;

access data on the data storage system in accordance with the read order;

determine a read throughput speed for the data access; and store the read throughput speed information corresponding to the identified degree of contiguous data.

16. The system of claim 15, further comprising calibrating service characteristic information for a different degree of contiguous data.

17. The system of claim 15, further comprising calibrating service characteristic information for a set of predetermined degrees of contiguous data.

18. The system of claim 17, wherein the set of predetermined degrees of contiguous data are spaced at regular or designated intervals.

19. The system of claim 15, the operations further comprising estimating a functional form of an expected read throughput speed.

20. The system of claim 15, the operations further comprising performing a deduplication operation in view of the stored read throughput speed information.

* * * * *